United States Patent [19]

Duncan et al.

[11] Patent Number: 5,480,074
[45] Date of Patent: Jan. 2, 1996

[54] MANNEQUIN

[76] Inventors: Daron D. Duncan; Patricia R. Duncan, both of 1812 Birch, Duncan, Okla. 73533

[21] Appl. No.: 17,066

[22] Filed: Feb. 12, 1993

[51] Int. Cl.$^6$ .............................. D06C 15/00; A41H 5/00; E05C 17/64; F16C 11/00
[52] U.S. Cl. ................... 223/66; 223/68; 16/338; 16/339; 16/37; 403/84; 403/83; 403/260
[58] Field of Search ................... 223/66, 68, 69, 223/84, 120; 16/296, 337, 338, 339, 341; 403/101, 91, 84, 83, 147, 260; 623/39; 602/16

[56] References Cited

U.S. PATENT DOCUMENTS

| | | | |
|---|---|---|---|
| 278,949 | 6/1883 | Hartman | 403/260 |
| 706,026 | 8/1902 | Crawford | 223/69 |
| 1,288,786 | 12/1918 | Wilschewksi | 403/147 |
| 1,427,392 | 8/1922 | Jones | 403/147 |
| 1,476,555 | 12/1923 | Timberlake | 223/69 |
| 1,690,194 | 11/1928 | Girton | 623/39 |
| 2,157,822 | 5/1939 | French | 223/69 |
| 2,161,451 | 6/1939 | Bolek et al. | 223/69 |
| 2,307,256 | 1/1943 | Burwell | 223/69 |
| 2,680,542 | 6/1954 | Keller | 223/69 |
| 2,887,257 | 5/1959 | Hokew | 223/69 |
| 4,599,998 | 7/1986 | Castillo | 128/77 |
| 5,000,170 | 3/1991 | Young et al. | 128/80 C |
| 5,197,790 | 3/1993 | Katz | 312/329 |

FOREIGN PATENT DOCUMENTS 134417  11/1919  United Kingdom ..................... 403/91

OTHER PUBLICATIONS

Counterbalance Advertisement in a magazine, DDI, Oct. 1992.
Counterbalance Advertisement—"I make good fashion dollars and sense", Dec. 1991.
Counterbalance Advertisement—"I'm a full form—so there's more of me to . . . ", Dec. 1991.
Counterbalance Advertisement—"We're a family of flair!", Dec. 1991.
Counterbalance Advertisement—"We can play all day and still look great!", Dec. 1991.
Counterbalance Advertisement —"You'll love to change me!", Dec. 1991.
Counterbalance Advertisement—"This new dog knows all the old tricks", Dec. 1991.

*Primary Examiner*—Bibhu Mohanty

[57] ABSTRACT

A mannequin having a plurality of body sections with each of the body sections being shaped in the form of a mannequin shape of a portion of an individual's body, and a plurality of hinge assemblies for interconnecting the body sections to form a mannequin shape of at least a portion of an individual. Each of the hinge assemblies is adjustable for adjusting the force required to hingedly move one of the body sections relative to the other body section connected thereto. In one embodiment, the hinge assemblies also include a portion for rotating one body section relative to the other body section connected thereto.

12 Claims, 9 Drawing Sheets

MANNEQUIN

FIELD OF THE INVENTION

The present invention relates generally to mannequins and, more particularly, but not by way of limitation, to a mannequin comprising a plurality of body sections interconnected with a plurality of hinges wherein the hinges are adjustable for adjusting the force required to hingedly move one of the body sections relative to the other body section connected thereto and wherein each of the hinge assemblies includes a portion for permitting the rotation of one of the body sections relative to the other body section connected thereto.

DESCRIPTION OF THE PREFERRED EMBODIMENTS

Referring to the drawings in general and to FIGS. 1 through 6 in particular, shown therein and designated by the general reference numeral 10 is a mannequin constructed in accordance with the present invention. The mannequin 10 has an overall shape simulating the shape of an individual, a mannequin shape. The mannequin 10 is shaped and adapted to support clothing items for the purpose of displaying such clothing items.

The mannequin 10 shown in FIGS. 1 through 6 is in the form of a female, a female form mannequin. Shown in FIGS. 7 through 12 is a modified mannequin 10a which is constructed exactly like the mannequin 10 shown in FIGS. 1 through 6, except the mannequin 10a (FIGS. 7 through 12) is in the form of a male, a male form mannequin. The details of construction will be described herein with respect to the female form mannequin 10 (FIGS. 1 through 6). It shall be understood that the male form mannequin 10a is constructed exactly like the female form mannequin 10 except for the shape of certain body parts and the detailed reference numerals will not be shown on the drawings in FIGS. 7 through 12.

The mannequin 10 comprises a plurality of body sections 12 (only one of the body sections 12 being designated in FIGS. 1 through 6 with a reference numeral). The body sections 12 more particularly comprise a head section 14, a torso section 16, a left upper arm section 18, a left lower arm section 20, a left hand section 22, a right upper arm section 24, a right lower arm section 26, a right hand section 28, a left upper leg section 30, a left lower leg section 32, a left foot section 34, a right upper leg section 36, a right lower leg section 38, and a right foot section 40. Each of the body sections 12 consists of one or more rod elements 42 (only one of the rod elements 42 being designated with a specific reference numeral in FIGS. 1 through 6).

The rod elements 42 in each of the body sections 12 are interconnected and shaped to form the mannequin shape of a portion of an individual's body. Each rod element 42 has a circularly shaped cross section.

The rod elements 42 in the head section 14 are interconnected and shaped to form a mannequin shape of an individual's head. The rod elements 42 in the torso sections 16 are shaped and interconnected to form the mannequin shape of an individual's torso. The rod elements in the left upper arm section 18 are shaped and interconnected to form the mannequin shape of an individual's left upper arm. The rod elements 42 in the left lower arm section 20 are interconnected and shaped to form the mannequin shape of an individual's left lower arm. The rod elements in the left hand section 22 are interconnected and shaped to form the mannequin shape of an individual's left hand. The rod elements in the right upper arm section 24 are interconnected and shaped to form the mannequin shape of an individual's right upper arm. The rod elements 42 in the right lower arm section 26 are interconnected and shaped to form the mannequin shape of an individual's right upper arm. The rod elements 42 in the right lower arm section 26 are interconnected and shaped to form the mannequin shape of an individual's right lower arm. The rod elements in the right hand section 28 are interconnected and shaped to form the mannequin shape of an individual's right hand. The rod elements 42 in the left upper leg section 30 are interconnected and shaped to form the mannequin shape of an individual's left upper leg. The rod elements 42 in the left lower left section 32 are interconnected then shaped to form the mannequin shape of an individual's left lower leg. The rod elements 42 in the left foot section 34 are interconnected and shaped to form the mannequin shape of an individual's left foot. The rod elements 42 in the right upper leg section 36 are interconnected and shaped to form the mannequin shape of an individual's right upper leg. The rod elements 42 in the right lower leg section 38 are interconnected and shaped to form the mannequin shape of an individual's right lower leg. The rod elements 42 in the right foot section 40 are interconnected and shaped to form the mannequin shape of an individual's right foot.

Although the mannequins 10 and 10a have been described herein in the form of a mannequin shape of an individual, the mannequin of the present invention may be shaped to form a small child or an animal or bird or a fish or any other form. The term "individual's body" as used herein and particularly as used in the claims is not intended to limit the invention to being in the form of a human, but rather is intended to include all forms just mentioned and any other form suitable for mannequin presentation. Further, a particular mannequin may include only some of the specific body sections described in connection with FIGS. 1 through 12 to comprise only a portion of a mannequin shape of a portion of an individual's body.

The mannequin 10 includes a plurality of hinge assemblies 44. Each of the hinge assemblies 44 is connected between two of the body sections 12 for permitting hinged movements between one of the body sections 12 relative to the other body section 12 connected thereto. The hinge assemblies 44 cooperate to interconnect the body sections 12 to form the mannequin shape of at least a portion of an individual. When all of the body sections 12, namely the head section 14, the torso section 16, the left upper arm section 18, the left lower arm section 20, the left hand 22, the right upper arm section 24, the right lower arm section 26, the right hand 28, the left upper leg section 30, the left lower leg section 32, the left foot section 34, the right upper leg section 36, the right lower leg section 38, and the right foot section 40 are interconnected by way of the hinge assemblies 44 the body sections 12 form the mannequin shape of an individual (a female in the case of the mannequin 10 and a male in the case of the mannequin 10a).

Each of the hinge assemblies 44 is constructed and includes means for adjusting the force required to hingedly move one of the body sections 12 relative to the other body section 12 connected thereto. Some of the hinge assemblies 44 include a rotational assembly 46 and, in this instance, each rotational assembly 46 is connected to one of the hinge assemblies 44 with the rotational assembly 46 being connected to one of the body sections 12 and the hinge assembly 44 being connected to one of the other body sections for permitting the rotation of one body section 12 relative to the other body section 12 connected thereto. More particularly, the hinge assembly 44 including the rotational assembly 46 is utilized to interconnect the head section 14 to the torso section 16, to interconnect the torso section 16 to the left upper arm section 18, to interconnect the torso section 16 to the right upper arm section 24, to interconnect the left lower arm section 20 to the left hand 22, to interconnect the right lower arm section 26 to the right hand 28, to interconnect the left upper leg section 30 to the torso section 16, and to interconnect the right upper leg section 36 to the torso section 16. Shown in FIGS. 13, 14 and 15 is a typical hinge assembly 44 and shown in FIG. 14 is a typical hinge assembly 44 including the rotational assembly 46.

Figure 1:
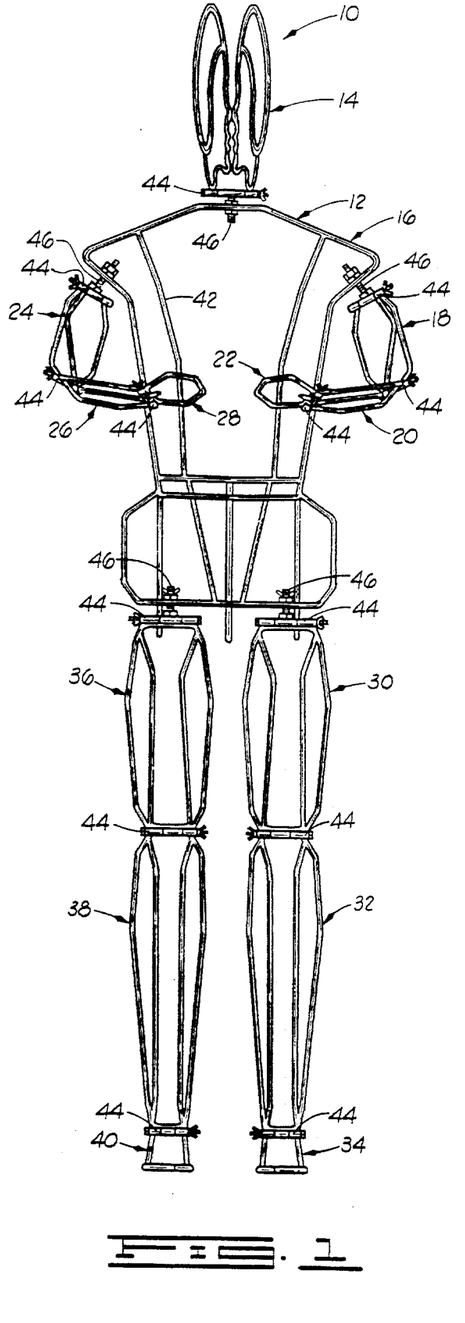
FIG. 1 is a front elevational view of a female form mannequin constructed in accordance with the present invention.
Figure 2:
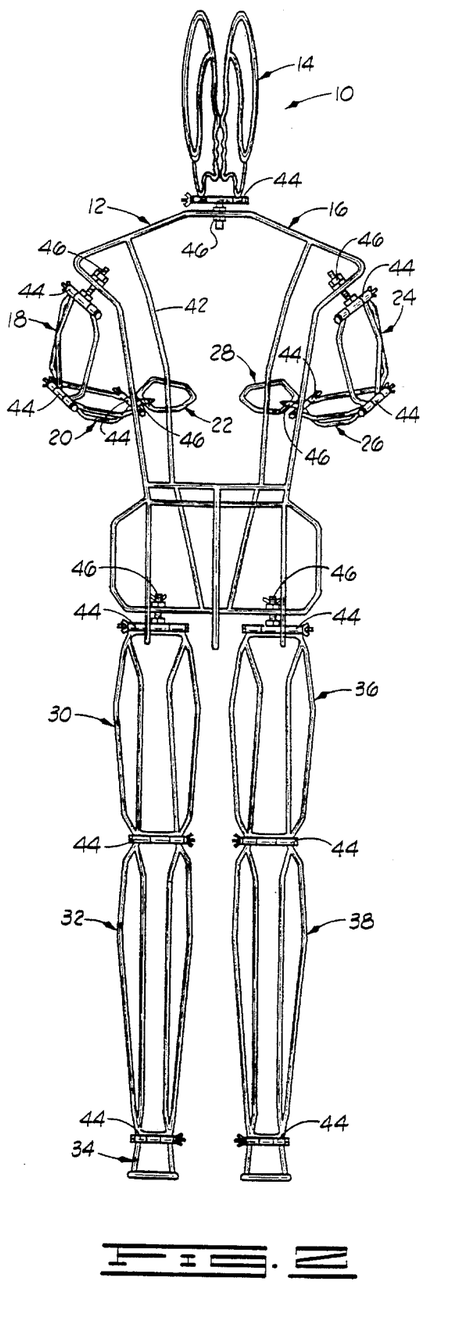
FIG. 2 is a rear elevational view of the female form mannequin.
Figure 3:
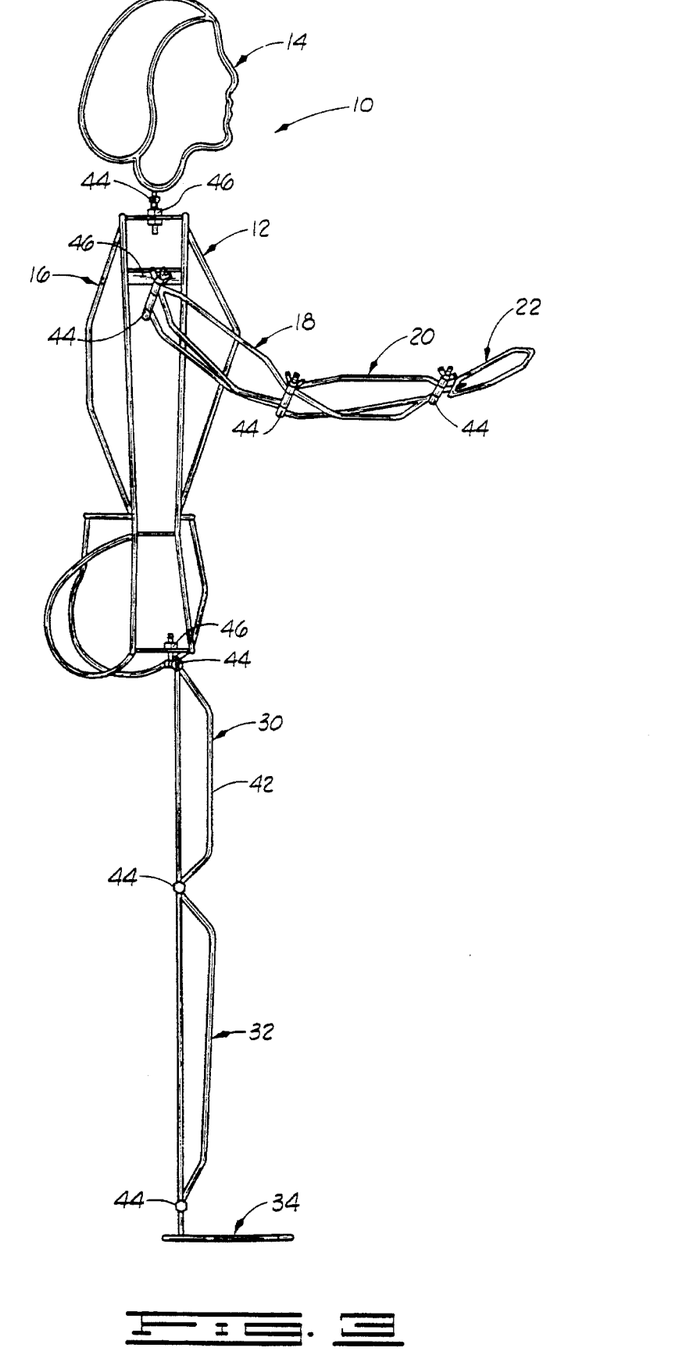
FIG. 3 is a left side elevational view of the female form mannequin.
Figure 4:
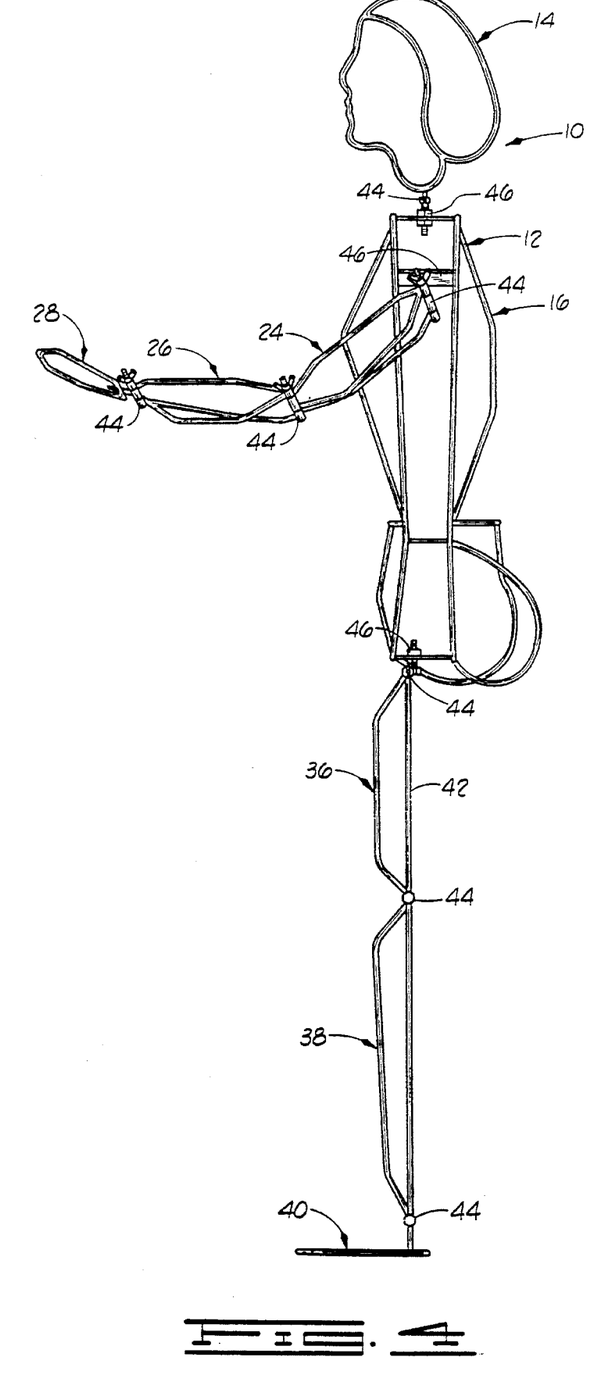
FIG. 4 is a right side elevational view of the female form mannequin of FIGS. 1 and 2.
Figure 5:
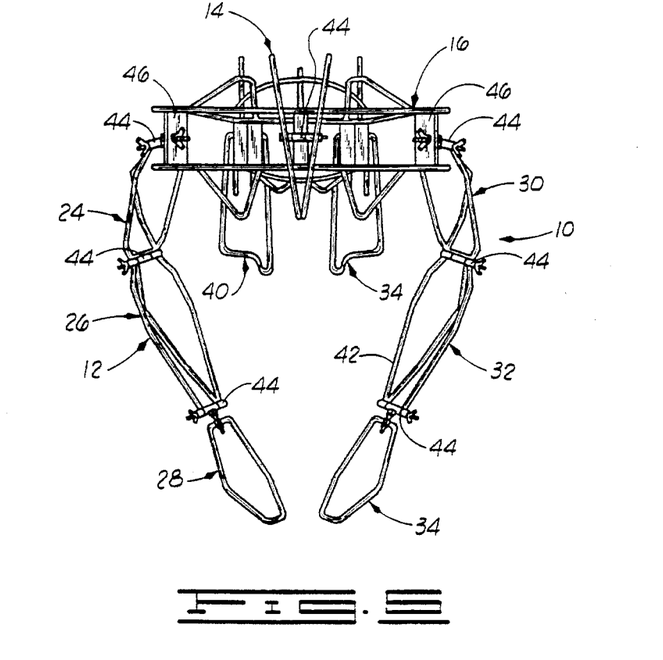
FIG. 5 is a top elevational view of the female form mannequin.
Figure 6:
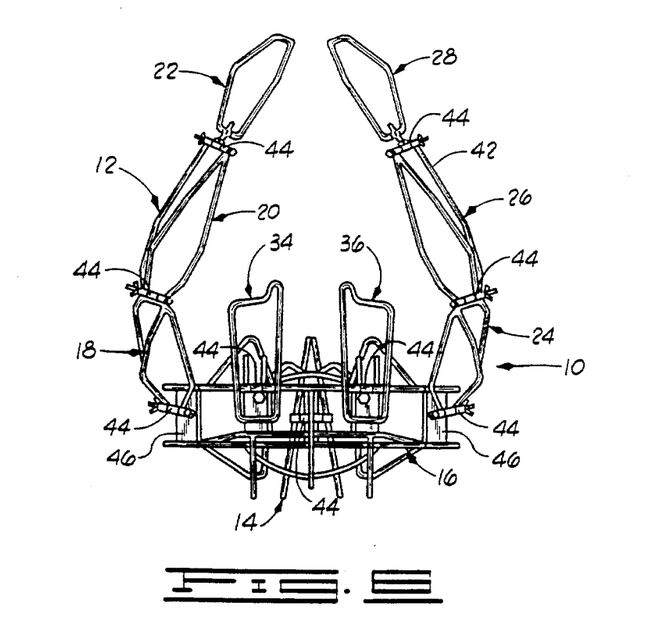
FIG. 6 is a bottom elevational view of the female form mannequin.
Figure 7:
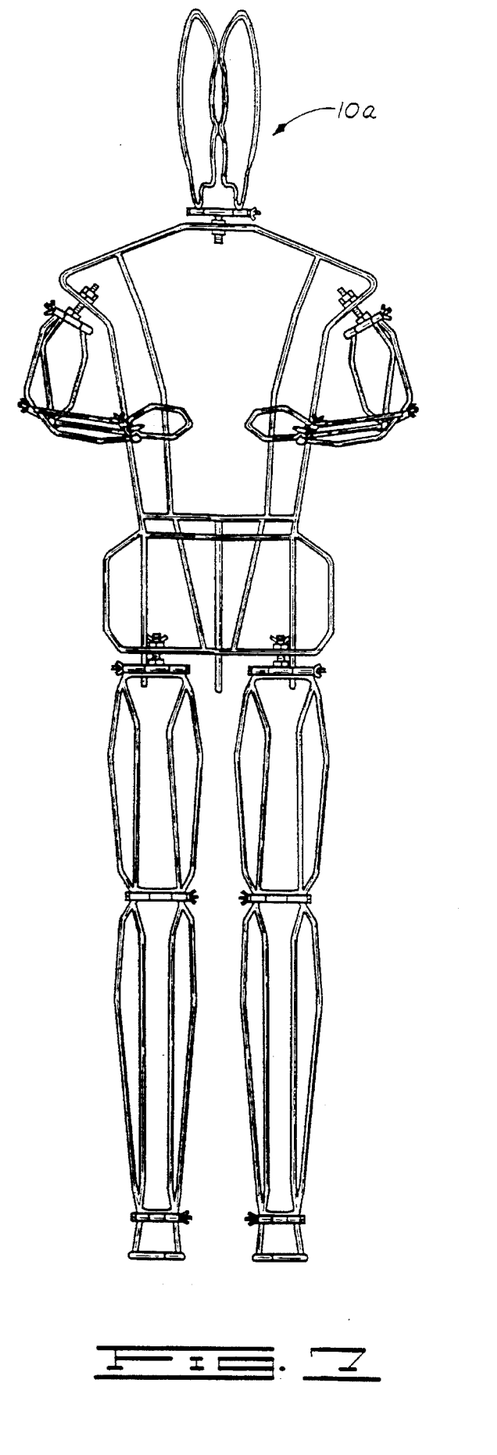
FIG. 7 is a front elevational view of a mannequin, similar to FIG. 1, but showing a male form mannequin.
Figure 8:
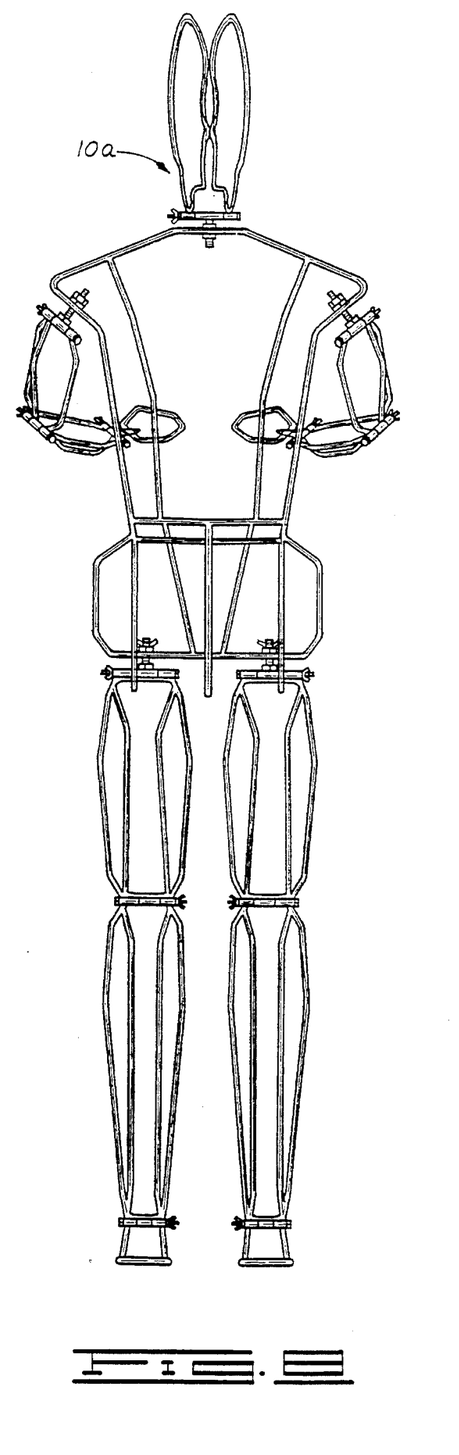
FIG. 8 is a rear elevational view of the male form mannequin.
Figure 9:
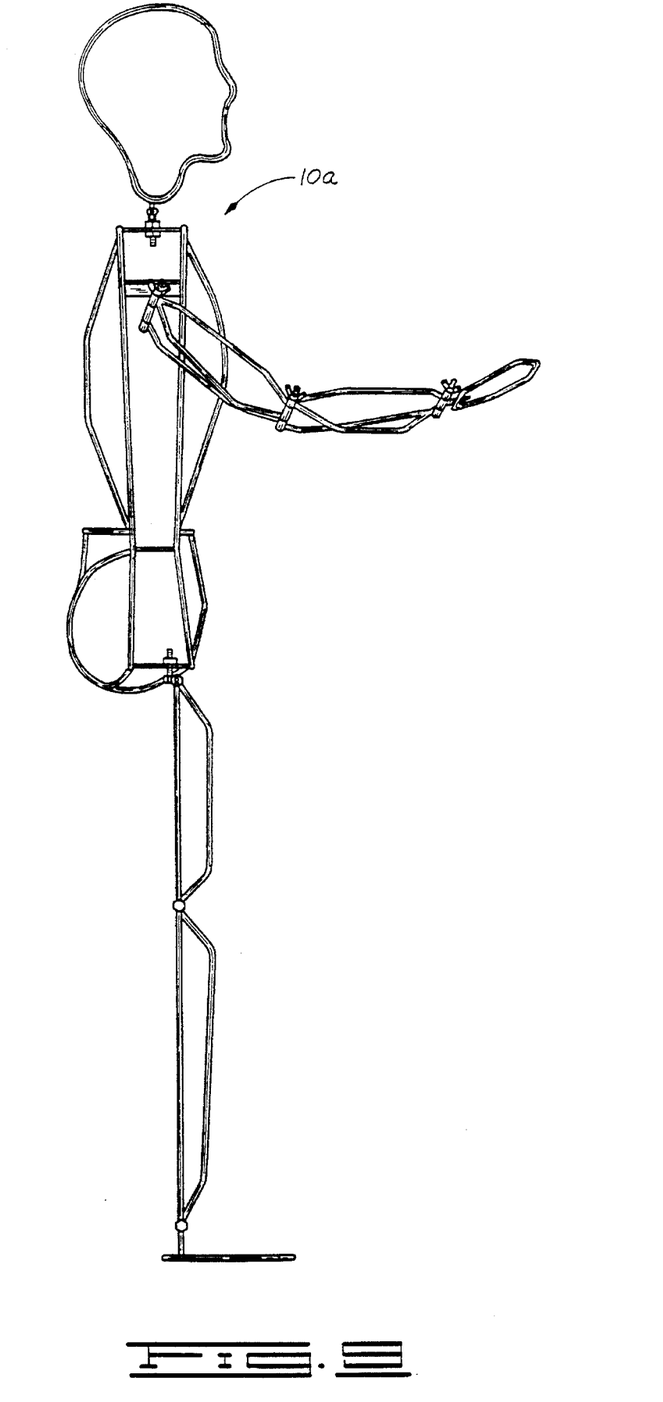
FIG. 9 is a left side elevational view of the male form mannequin.
Figure 10:
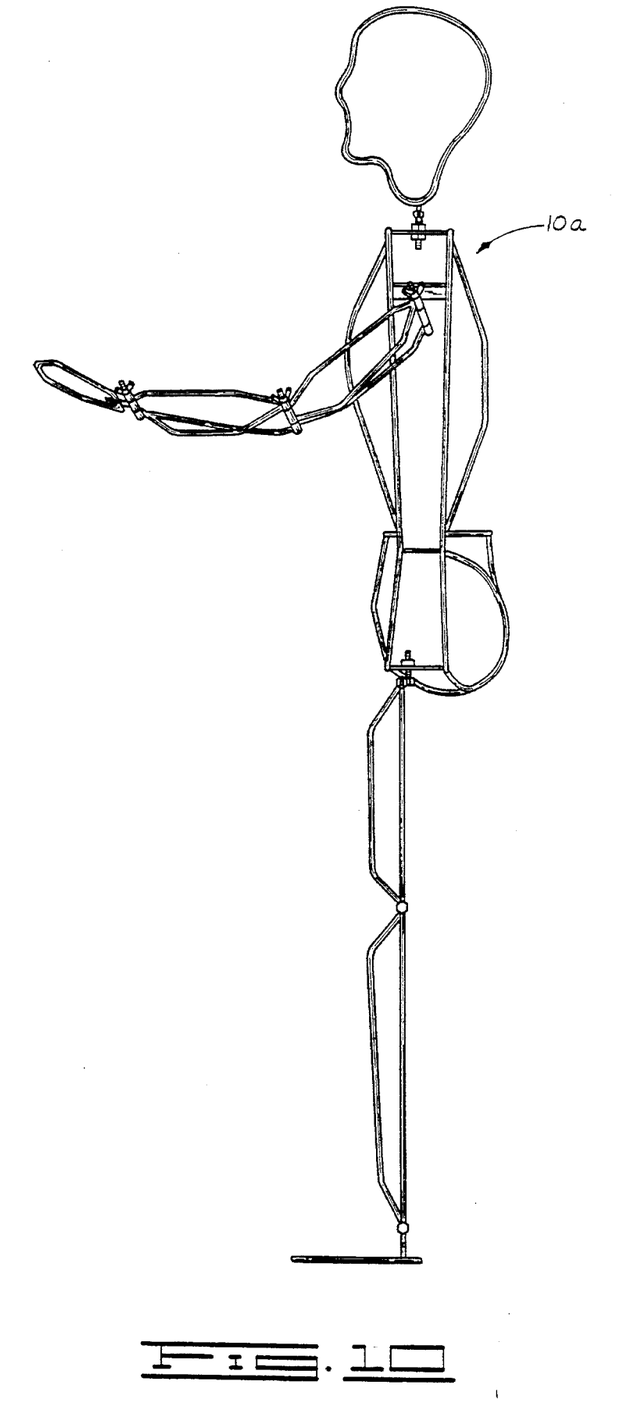
FIG. 10 is a right side elevational view of the male form mannequin.
Figure 11:
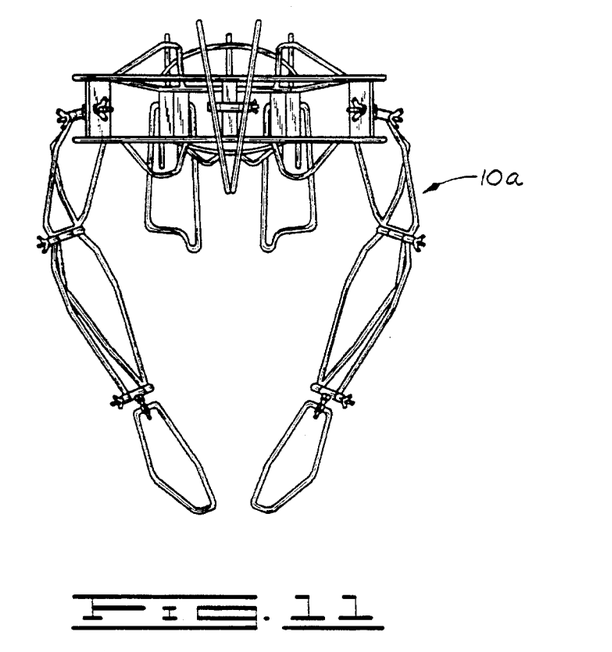
FIG. 11 is a top elevational view of the male form mannequin.
Figure 12:
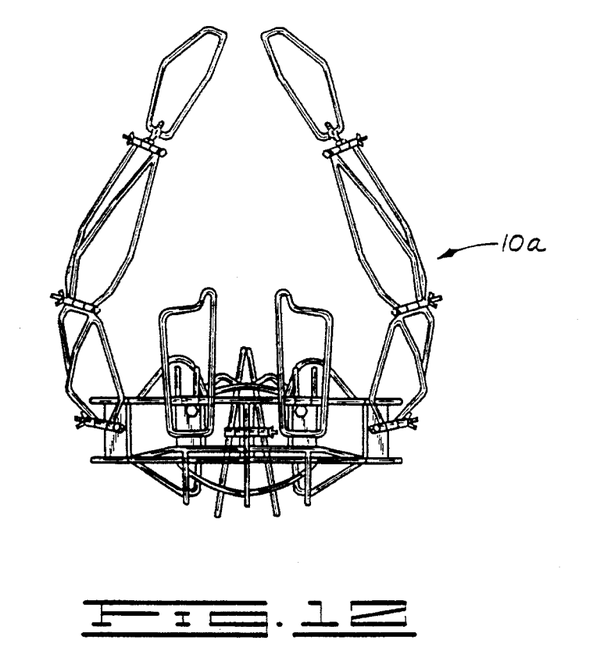
FIG. 12 is a bottom elevational view of the male form mannequin.
Figure 13:
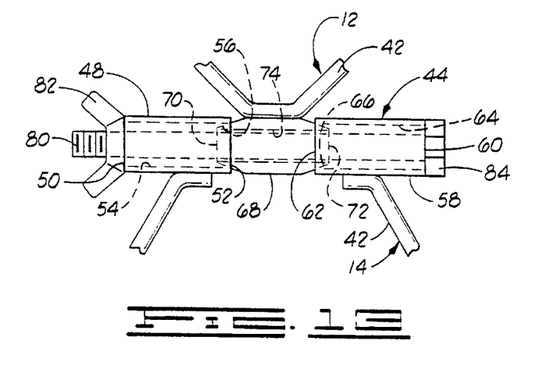
FIG. 13 is an enlarged side elevational view of a typical rotational assembly for connecting two of the body sections of the mannequin of the present invention.
Figure 14:
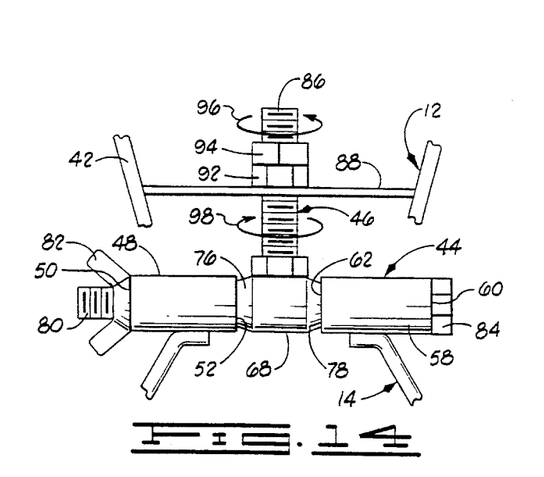
FIG. 14 is a view of the rotational assembly of FIG. 13 showing a modified connection between two of the body sections.
Figure 15:
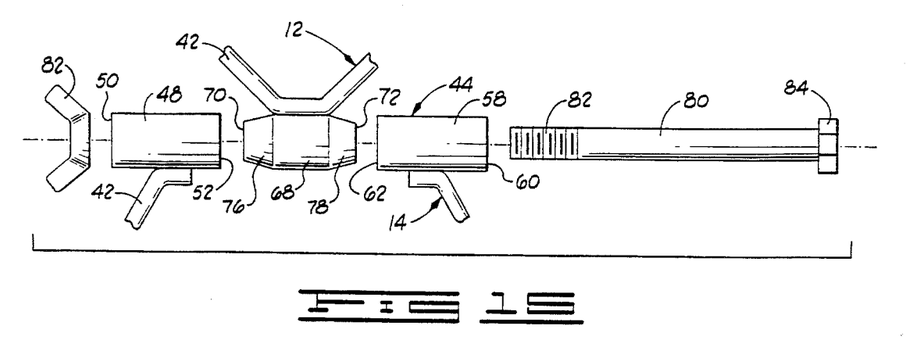
FIG. 15 is an exploded view of the rotational assembly of FIG. 13.
Figure 16:
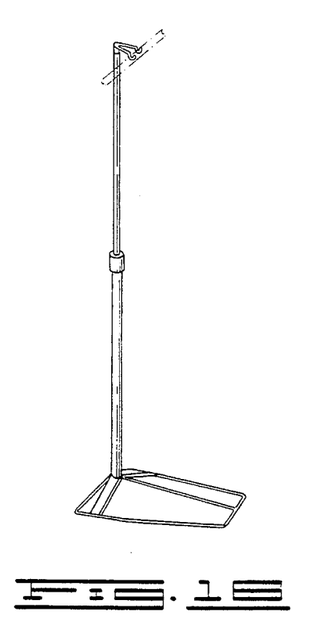
FIG. 16 is a perspective view of a stand for supporting the mannequin with a portion of the mannequin being shown in dashed lines in FIG. 16.

Referring to FIGS. 13 and 15, shown therein is a typical hinge assembly 44 without the rotational assembly 46. The hinge assembly 44 without the rotational assembly 46 is used to interconnect the left upper arm section 18 to the left lower arm section 20, the right upper arm section 24 to the right lower arm section 26, the left upper leg section 30 to the left lower leg section 32 the left lower leg section 32 to the left foot section 34, the right upper leg section 36 to the right lower leg section 38 and the right lower leg section 38 to the right foot section 40.

The hinge assembly 44 (FIGS. 13 and 15) consists of a first cylindrically shaped end hinge member 48 having a first end 50 and a second end 52. A hinge opening 54 (FIG. 13) is formed through the first end hinge member 48. The hinge opening 54 extends through the first end hinge member 48 intersecting the first and the second ends 50 and 52 thereof. A portion of the inner peripheral surface formed in the first end hinge member 48 by the hinge opening 54 near the second end 52 thereof is tapered to form a tapered second end portion 56 (FIG. 13). The first end hinge member 48 is cylindrically shaped.

The hinge assembly 44 also includes a second end hinge member 58. The second end hinge member 58 has a first end 60 and a second end 62. A hinge opening 64 (FIG. 13) is formed through the second end hinge member 58. The hinge opening 64 intersects the first end 60 and the second end 62. A portion of the inner peripheral surface in the second end hinge member 58 formed by the hinge opening 64 near the second end 62 thereof is tapered to form a tapered second end portion 66 (FIG. 13). The second end hinge member 58 also is cylindrically shaped.

The hinge assembly 44 also includes an intermediate hinge member 68 having a first end 70 and a second end 72. A hinge opening 74 (FIG. 13) is formed through the intermediate hinge member 68. The hinge opening 74 intersects the first and the second ends 70 and 72 of the intermediate hinge member 68. A portion of the outer peripheral surface near the first end 70 is tapered to form a tapered first end portion 76 (FIGS. 14 and 15). A portion of the outer peripheral surface of the intermediate hinge member 68 near the second end 72 also is tapered to form a tapered second end portion 78 (FIGS. 14 and 15).

In an assembled position, the second end 52 of the first end hinge member 48 is disposed near the first end 70 of the intermediate hinge member 68 and positioned so that the tapered first end portion 76 of the intermediate hinge member 68 is disposed a distance into the hinge opening 54 of the first end hinge member 48 to a position wherein the tapered second end portion 56 is disposed generally adjacent the tapered first end portion 76 of the intermediate hinge member 68. The second end 72 of the intermediate hinge member 68 is disposed adjacent the second end 62 of the second end hinge member 58 and positioned so that a portion of the tapered second end portion 78 of the intermediate hinge member 68 is disposed in the hinge opening 64 in the second end hinge member 58 and positioned so that the tapered second end portion 66 of the second end hinge member 58 is disposed generally adjacent the tapered second end portion 78 of the intermediate hinge member 68. In this position of the hinge members 48, 58 and 68, a hinge pin 80 is extended through the hinge members 48, 58 and 68. The hinge pin 80 is sized so that a portion of the hinge pin 80 extends beyond the first end 60 of the second end hinge member 58 and another portion of the hinge pin 80 extends a distance beyond the first end 50 of the first end hinge member 48.

At least a portion of the outer peripheral surface of the hinge pin 80 near one end thereof is threaded and a wing nut 82 is threadedly disposed over that end of the hinge pin 80. A pin head 84 is formed on the opposite end of the hinge pin 80.

When the wing nut 82 is unthreaded from the hinge pin 80, the first and the second end hinge members 48 and 58 each are loosened and moved away from the intermediate hinge member 68 so that the first and the second end hinge members 48 and 50 may be relatively easily rotated with respect to the intermediate hinge member 68 or in the alternative, the intermediate hinge member 68 may be relatively easily rotated with respect to the first and the second end hinge members 48 and 58. One of the body sections 14 is connected to the intermediate hinge member 68 and the other body section is connected to the first and the second end hinge members 48 and 58. Thus, when the wing nut 82 is unthreaded with respect to the hinge pin 80, the body sections 14 connected to the hinge assembly 44 may be rotated relative to each other.

When the body sections 12 connected to the hinge assembly 44 have been rotated to the desired position relative to each other, the wing nut 82 is threaded onto the hinged pin 80 tightly to move the first end hinge member 48 toward the intermediate hinge member 68 and to move the second end hinge member 58 toward the intermediate hinge member 68. As the second end 52 of the first end hinge member 48 is moved into the hinge opening 74 in the intermediate hinge member 68, more surface area on the tapered second end portion 56 of the first end hinge member 48 engages the tapered first end portion 76 in the intermediate hinge member 68 thereby increasing the frictional engagement between the first end hinge member 48 and the intermediate hinge member 68. As the second end 62 of the second end hinge member 58 is moved into the hinge opening 74 in the intermediate hinge member 68, more surface area on the tapered second end portion 66 of the second end hinge member 58 engages the tapered second end portion 78 in the intermediate hinge member 68 thereby increasing the frictional engagement between the second end hinge member 58 and the intermediate hinge member 68.

The increased frictional engagement between the first and the second end hinge members 48 and 58 and the intermediate hinge member 68 substantially prevents rotation of the first and the second end hinge members 48 and 58 relative to the intermediate hinge member 68 or, in the alternative, rotation of the intermediate hinge member 68 relative to the first and the second end hinge members 48 and 58 thereby substantially locking the body sections 12 connected thereto in a stationary, fixed position.

The hinge assembly 44 shown in FIG. 14 is constructed exactly like the hinge assembly 44 shown in FIGS. 13 and 15, except the hinge assembly 44 shown in FIG. 14 also includes the rotational assembly 46.

The rotational assembly 46 comprises a post 86 having one end connected to the intermediate hinge member 68. The post 86 extends a distance outwardly from the outer peripheral surface of the intermediate hinge member 68 terminating with the opposite end of the post 86. The post 86 is extended through an opening (not shown) in a plate 88 connected to one of the body sections 12. A nut 92 is secured to the plate 88 and the post 86 is threadedly disposed through the nut 92, a portion of the threaded post 86 extending a distance beyond the nut 92. A wing nut 94 is threadly disposed over the post 86 and engages the nut 94. Thus, the body section 12 having the plate 88 secured thereto can be rotated about the threaded post 86 in a first direction 96 or a second direction 98 relative to the body section 12 connected to the first and the second end hinge members 48 and 58.

When the body sections 12 have been hingedly moved about the hinge assembly 44 to the proper relative positions, the wing nut 82 is tightened thereby substantially locking the body sections in the preset position. Further, when the body sections have been rotated to the proper position, the nut 94 of the rotational assembly 46 is tightened to secure the body sections in the relative rotational positions.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A mannequin comprising:

a head section;

a torso section;

a hinge assembly connected to the torso section and having a rotational assembly connected to the head section, the hinge assembly permitting hinged movements of the head section relative to the torso section and the rotational assembly portion of the hinge assembly permitting rotational movement of the head section relative to the torso section;

a left upper arm section;

a hinge assembly including a rotational assembly with the hinge assembly being connected to the left upper arm section and the rotational assembly being connected to the torso section, the hinge assembly permitting hinged movement of the left upper arm section relative to the torso section and the rotational assembly permitting rotational movement of the left upper arm section relative to the torso section;

a left lower arm section;

a hinge assembly connected to the left lower arm section and connected to the left upper arm section for permitting hinged movement of the left lower arm section relative to the left upper arm section;

a left hand section;

a hinge assembly including a rotational assembly with the hinge assembly being connected to the left lower arm section and the rotational assembly being connected to the hand section, the hinge assembly permitting rotational movement of the left hand section relative to the left lower arm section and the rotational assembly permitting rotational movement of the left hand section relative to the left lower arm section;

a right upper arm section;

a hinge assembly including a rotational assembly with the hinge assembly being connected to the right upper arm section and the rotational assembly being connected to the torso section, the hinge assembly permitting hinged movement of the right upper arm section relative to the torso section and the rotational assembly permitting rotational movement of the right upper arm section relative to the torso section;

a right lower arm section;

a hinge assembly connected to the right lower arm section and connected to the right upper arm section for permitting hinged movement of the right lower arm section relative to the right upper arm section;

a right hand section;

a hinge assembly including a rotational assembly with the hinge assembly being connected to the right lower arm section and the rotational assembly being connected to the hand section, the hinge assembly permitting rotational movement of the right hand section relative to the right lower arm section and the rotational assembly permitting rotational movement of the right hand section relative to the right lower arm section;

a left upper leg section;

a hinge assembly including a rotational assembly with the hinge assembly being connected to the left lower leg section and the rotational assembly being connected to the torso section, the hinge assembly permitting hinged movement of the left upper leg relative to the torso and the rotational assembly permitting rotational movement of the left upper leg section relative to the torso section;

a left lower leg section;

a hinge assembly connected to the left lower leg section and connected to the left upper leg section for permitting hinged movement of the left lower leg section relative to the left upper leg section;

a left foot section;

a hinged assembly connected to the left foot section and connected to the left lower leg section for permitting hinged movement of the left foot section relative to the left lower leg section;

a right upper leg section;

a hinge assembly including a rotational assembly with the hinge assembly being connected to the right lower leg section and the rotational assembly being connected to the torso section, the hinge assembly permitting hinged movement of the right upper leg relative to the torso and the rotational assembly permitting rotational movement of the right upper leg section relative to the torso section;

a right lower leg section;

a hinge assembly connected to the right lower leg section and connected to the right upper leg section for permitting hinged movement of the right lower leg section relative to the right upper leg section;

a right foot section;

a hinged assembly connected to the right foot section and connected to the right lower leg section for permitting hinged movement of the right foot section relative to the right lower leg section; and wherein each hinge assembly comprises:

a first end hinge member having a first end and a second end, a hinge opening being formed through the first end hinge member intersecting the first and the second ends of the first end hinge member;

a second end hinge member having a first end and a second end, a hinge Opening being formed through the second end hinge member intersecting the first and the second ends of the second end hinge member;

an intermediate hinge member having a first end and a second end, a hinge opening being formed through the intermediate hinge member intersecting the first and the second ends of the intermediate hinge member, the intermediate hinge member being disposed between the first end hinge member and the second end hinge member with the second end of the first end hinge member being disposed about adjacent the first end of the intermediate hinge member and the second end of the second end hinge member being disposed about adjacent the second end of the intermediate hinge member;

a hinge pin extending through the hinge openings in the first end hinge member, the second end hinge member and the intermediate hinge member with a head means disposed on one end of the hinge pin engaging the first end of the second end hinge member and a nut means being disposed on the opposite end of the hinge pin, one of the body sections being connected to the intermediate hinge member and one of the other body sections being connected to the first end hinge member and the second end hinge member whereby the first end hinge member and the second end hinge member and the body section connected thereto are hingedly rotatable about the hinge pin relative to the intermediate hinge member and the body section connected thereto, the nut means being tightenable for increasing the friction between the first end hinge member and the intermediate hinge member and for increasing the friction between the second end hinge member and the intermediate hinge member for substantially preventing rotation of the first and the second hinge members relative to the intermediate hinge member.

2. The mannequin of claim 1 wherein the first end hinge member is defined further as having a portion of an inner peripheral surface formed by the hinge opening near the second end thereof is tapered to form a tapered second end portion on the first hinge member, and wherein a portion of an inner peripheral surface of the second end hinge member formed by the hinge opening near the second end thereof is tapered to form a tapered second end portion of the second end hinge member, and wherein a portion of an outer peripheral surface of the intermediate hinge member is tapered to form a tapered first end portion and a portion of an outer peripheral surface of the intermediate hinge member near the second end thereof is tapered to form a tapered second end portion, the tapered first end portion of the intermediate hinge member being inserted into the tapered second end portion of the first end hinge member and the tapered second end portion of the intermediate hinge member being inserted into the tapered second end portion of the second end hinge member.

3. The mannequin of claim 1 wherein each of the body sections consists of one or more rod elements with the rod elements being shaped and interconnected to form the mannequin shape of at least a portion of an individual.

4. The mannequin of claim 1 wherein the head section further comprises a plurality of rod elements interconnected and shaped to form the mannequin shape of an individual's head, and wherein the torso section is defined further as comprising a plurality of rod elements with the rod elements being shaped and interconnected to form the mannequin shape of an individual's torso, and wherein the left upper arm section is defined further as comprising a plurality of rods shaped and interconnected to form the mannequin shape of an individual's left upper arm, and wherein the left lower arm section is defined further as comprising a plurality of rod elements shaped and interconnected to form the mannequin shape of an individual's left lower arm, and wherein the left hand section is defined further as comprising at least one rod shaped to form the mannequin shape of an individual's left hand, and wherein the right upper arm section is defined further as comprising a plurality of rods shaped and interconnected to form the mannequin shape of an individual's right upper arm, and wherein the right lower arm section is defined further as comprising a plurality of rod elements shaped and interconnected to form the mannequin shape of an individual's right lower arm, and wherein the right hand section is defined further as comprising at least one rod shaped to form the mannequin shape of an individual's right hand, and wherein the left upper leg section is defined further as comprising a plurality of rod elements shaped and interconnected to form the mannequin shape of an individual's left upper leg, and wherein the left lower leg section is defined further as comprising a plurality of rod elements shaped and interconnected to form the mannequin shape of an individual's left lower leg, and wherein the left foot section is defined further as comprising at least one rod shaped to form the mannequin shape of an individual's left foot, and wherein the right upper leg section is defined further as comprising a plurality of rod elements shaped and interconnected to form the mannequin shape of an individual's right upper leg, and wherein the right lower leg section is defined further as comprising a plurality of rod elements shaped and interconnected to form the mannequin shape of an individual's right lower leg, and wherein the right foot section is defined further as comprising at least one rod shaped to form the mannequin shape of an individual's right foot.

5. The mannequin of claim 1 wherein the hinge assembly connected to the torso section and the head section further comprises a rotational assembly with the rotational assembly being connected to the head section for permitting rotational movement of the head section relative to the torso section; and wherein the hinge assembly connected between the left upper arm section and the torso section further comprises a rotational assembly connected to the torso section for permitting rotational movement of the left upper arm section relative to the torso section; and wherein the hinge assembly connected to the left lower arm section and the hand section further comprises a rotational assembly connected to the left hand section for permitting rotational movement of the left hand section relative to the left lower arm section; and wherein the hinge assembly connecting the right upper arm section to the torso section further comprises a rotational assembly connected to the torso section for permitting rotational movement of the left upper arm section relative to the torso section; and wherein the hinge assembly connected to the right lower arm section and the hand section further comprises a rotational assembly connected to the right hand section for permitting rotational movement of the right hand section relative to the right lower arm section; and wherein the hinge assembly connected to the left upper leg section and the torso section further comprises a rotational assembly connected to the torso section for permitting rotational movement of the left upper leg section relative to the torso section; and wherein the hinge assembly connected between the torso section and the right upper leg section further comprises a rotational assembly connected to the torso section for permitting rotational movement of the right upper leg section relative to the torso section.

6. A mannequin comprising:
  a plurality of body sections, each body section being shaped in the form of a mannequin shape of a part of an individual's body; and
  a plurality of hinge assemblies, each hinge assembly being connected between two of the body sections for permitting hinged movement of one body section connected thereto relative to the other body section connected thereto, the hinge assemblies cooperating to interconnect the body sections to form a mannequin shape of at least a portion of an individual, each hinge assembly being adjustable for adjusting the force required to hingedly move one of the body sections connected thereto relative to the other body section connected thereto, each hinge assembly comprising:
    a first end hinge member having a first end and a second end, a hinge opening being formed through the first end hinge member intersecting the first and the second ends of the first end hinge member;
    a second end hinge member having a first end and a second end, a hinge opening being formed through the second end hinge member intersecting the first and the second ends of the second end hinge member;
    an intermediate hinge member having a first end and a second end, a hinge opening being formed through the intermediate hinge member intersecting the first and the second ends of the intermediate hinge member, the intermediate hinge member being disposed between the first end hinge member and the second end hinge member with the second end of the first end hinge member being disposed about adjacent the first end of the intermediate hinge member and the second end of the second end hinge member being disposed about adjacent the second end of the intermediate hinge member;
    a hinge pin extending through the hinge openings in the first end hinge member, the second end hinge member and the intermediate hinge member with a head means disposed on one end of the hinge pin engaging the first end of the second end hinge member and a nut means being disposed on the opposite end of the hinge pin, one of the body sections being connected to the intermediate hinge member and one of the other body sections being connected to the first end hinge member and the second end hinge member whereby the first end hinge member and the second end hinge member and the body section connected thereto are hingedly rotatable about the hinge pin relative to the intermediate hinge member and the body section connected thereto, the nut means being tightenable for increasing the friction between the first end hinge member and the intermediate hinge member and for increasing the friction between the second end hinge member and the intermediate hinge member for substantially preventing rotation of the first and the second hinge members relative to the intermediate hinge member.

7. The mannequin of claim 6 wherein the first end hinge member is defined further as having a portion of an inner peripheral surface formed by the hinge opening near the second end thereof is tapered to form a tapered second end portion on the first hinge member, and wherein a portion of an inner peripheral surface of the second end hinge member formed by the hinge opening near the second end thereof is tapered to form a tapered second end portion of the second end hinge member, and wherein a portion of an outer peripheral surface of the intermediate hinge member is tapered to form a tapered first end portion and a portion of an outer peripheral surface of the intermediate hinge member near the second end thereof is tapered to form a tapered second end portion, the tapered first end portion of the intermediate hinge member being inserted into the tapered second end portion of the first end hinge member and the tapered second end portion of the intermediate end hinge member being inserted into the tapered second end portion of the second end hinge member.

8. The mannequin of claim 6 wherein at least some of the hinge assemblies are defined further as comprising:
  a rotational assembly, comprising:
    a post having opposite ends with one end of the post being connected to the intermediate hinge member and the opposite end of the post being rotatably connected to one of the body sections for permitting rotational movement of the body section connected to the post relative to the body section connected to the first and the second end hinge members.

9. A mannequin comprising:
  at least two body sections, each body section being shaped in the form of a mannequin shape of a portion of an individual's body; and a hinge assembly connected to each of the body sections for permitting hinge movement of one of the body sections connected thereto relative to the other body section connected thereto, the hinge assembly cooperating to interconnect the body sections to form a mannequin shape of at least a portion of an individual, the hinge assembly comprising:

a first end hinge member having a first end and a second end, a hinge opening being formed through the first end hinge member intersecting the first and the second ends of the first end hinge member;

a second end hinge member having a first end and a second end, a hinge opening being formed through the second end hinge member intersecting the first and the second ends of the second end hinge member;

an intermediate hinge member having a first end and a second end, a hinge opening being formed through the intermediate hinge member intersecting the first and the second ends of the intermediate hinge member, the intermediate hinge member being disposed between the first end hinge member and the second end hinge member with the second end of the first end hinge member being disposed about adjacent the first end of the intermediate hinge member and the second end of the second end hinge member being disposed about adjacent the second end of the intermediate hinge member;

a hinge pin extending through the hinge openings in the first end hinge member, the second end hinge member and the intermediate hinge member with a head means disposed on one end of the hinge pin engaging the first end of the second end hinge member and a nut means being disposed on the opposite end of the hinge pin, one of the body sections being connected to the intermediate hinge member and one of the other body sections being connected to the first end hinge member and the second end hinge member whereby the first end hinge member and the second end hinge member and the body section connected thereto are hingedly rotatable about the hinge pin relative to the intermediate hinge member and the body section connected thereto, the nut means being tightenable for increasing the friction between the first end hinge member and the intermediate hinge member and for increasing the friction between the second end hinge member and the intermediate hinge member for substantially preventing rotation of the first and the second hinge members relative to the intermediate hinge member.

10. The mannequin of claim 9 wherein the first end hinge member is defined further as having a portion of an inner peripheral surface formed by the hinge opening near the second end thereof is tapered to form a tapered second end portion on the first hinge member, and wherein a portion of an inner peripheral surface of the second end hinge member formed by the hinge opening near the second end thereof is tapered to form a tapered second end portion of the second end hinge member, and wherein a portion of an outer peripheral surface of the intermediate hinge member is tapered to form a tapered first end portion and a portion of an outer peripheral surface of the intermediate hinge member near the second end thereof is tapered to form a tapered second end portion, the tapered first end portion of the intermediate hinge member being inserted into the tapered second end portion of the first end hinge member and the tapered second end portion of the intermediate hinge member being inserted into the tapered second end portion of the second end hinge member.

11. The mannequin of claim 9 wherein at least some of the hinge assemblies are defined further as comprising:

a rotational assembly, comprising:

a post having opposite ends with one end of the post being connected to the intermediate hinge member and the opposite end of the post being rotatably connected to one of the body sections for permitting rotational movement of the body section connected to the post relative to the body section connected to the first and the second end hinge members.

12. A mannequin comprising:

a head section;

a torso section;

a hinge assembly connected to the torso section and having a rotational assembly connected to the head section, the hinge assembly permitting hinged movements of the head section relative to the torso section and the rotational assembly portion of the hinge assembly permitting rotational movement of the head section relative to the torso section;

a left upper arm section;

a hinge assembly including a rotational assembly with the hinge assembly being connected to the left upper arm section and the rotational assembly being connected to the torso section, the hinge assembly permitting hinged movement of the left upper arm section relative to the torso section and the rotational assembly permitting rotational movement of the left upper arm section relative to the torso section;

a left lower arm section;

a hinge assembly connected to the left lower arm section and connected to the left upper arm section for permitting hinged movement of the left lower arm section relative to the left upper arm section;

a left hand section;

a hinge assembly including a rotational assembly with the hinge assembly being connected to the left lower arm section and the rotational assembly being connected to the hand section, the hinge assembly permitting rotational movement of the left hand section relative to the left lower arm section and the rotational assembly permitting rotational movement of the left hand section relative to the left lower arm section;

a right upper arm section;

a hinge assembly including a rotational assembly with the hinge assembly being connected to the right upper arm section and the rotational assembly being connected to the torso section, the hinge assembly permitting hinged movement of the right upper arm section relative to the torso section and the rotational assembly permitting rotational movement of the right upper arm section relative to the torso section;

a right lower arm section;

a hinge assembly connected to the right lower arm section and connected to the right upper arm section for permitting hinged movement of the right lower arm section relative to the right upper arm section;

a right hand section;

a hinge assembly including a rotational assembly with the hinge assembly being connected to the right lower arm section and the rotational assembly being connected to the hand section, the hinge assembly permitting rotational movement of the right hand section relative to the right lower arm section and the rotational assembly permitting rotational movement of the right hand section relative to the right lower arm section;

a left upper leg section;

a hinge assembly including a rotational assembly with the hinge assembly being connected to the left lower leg section and the rotational assembly being connected to the torso section, the hinge assembly permitting hinged movement of the left upper leg relative to the torso and the rotational assembly permitting rotational movement of the left upper leg section relative to the torso section;

a left lower leg section;

a hinge assembly connected to the left lower leg section and connected to the left upper leg section for permitting hinged movement of the left lower leg section relative to the left upper leg section;

a left foot section;

a hinged assembly connected to the left foot section and connected to the left lower leg section for permitting hinged movement of the left foot section relative to the left lower leg section;

a right upper leg section;

a hinge assembly including a rotational assembly with the hinge assembly being connected to the right lower leg section and the rotational assembly being connected to the torso section, the hinge assembly permitting hinged movement of the right upper leg relative to the torso and the rotational assembly permitting rotational movement of the right upper leg section relative to the torso section;

a right lower leg section;

a hinge assembly connected to the right lower leg section and connected to the right upper leg section for permitting hinged movement of the right lower leg section relative to the right upper leg section;

a right foot section;

a hinged assembly connected to the right foot section and connected to the right lower leg section for permitting hinged movement of the right foot section relative to the right lower leg section; and wherein the hinge assembly connected to the torso section and the head section further comprises a rotational assembly with the rotational assembly being connected to the head section for permitting rotational movement of the head section relative to the torso section; and wherein the hinge assembly connected between the left upper arm section and the torso section further comprises a rotational assembly connected to the torso section for permitting rotational movement of the left upper arm section relative to the torso section; and wherein the hinge assembly connected to the left lower arm section and the hand section further comprises a rotational assembly connected to the left hand section for permitting rotational movement of the left hand section relative to the left lower arm section; and wherein the hinge assembly connecting the right upper arm section to the torso section further comprises a rotational assembly connected to the torso section for permitting rotational movement of the left upper arm section relative to the torso section; and wherein the hinge assembly connected to the right lower arm section and the hand section further comprises a rotational assembly connected to the right hand section for permitting rotational movement of the right hand section relative to the right lower arm section; and wherein the hinge assembly connected to the left upper leg section and the torso section further comprises a rotational assembly connected to the torso section for permitting rotational movement of the left upper leg section relative to the torso section; and wherein the hinge assembly connected between the torso section and the right upper leg section further comprises a rotational assembly connected to the torso section for permitting rotational movement of the right upper leg section relative to the torso section, and wherein each hinge assembly:

hinge member means having a hinge opening through a portion thereof; and a hinge pin extending through the hinge opening in the hinge member means with a head means disposed on one end of the hinge pin engaging an end of the hinge member means and a nut means disposed on the opposite end of the hinge pin, one of the body sections being connected to one portion of the hinge member means and one other body section being connected to another portion of the hinge member means whereby at least a portion of the hinge member means and the body section connected thereto are hingedly rotatable about the hinge pin, the nut means being tightenable for increasing the friction between the hinge member means for substantially preventing rotation of the hinge member means.

* * * * *

UNITED STATES PATENT AND TRADEMARK OFFICE
CERTIFICATE OF CORRECTION

PATENT NO. : 5,480,074

DATED : January 2, 1996

INVENTOR(S) : Duncan et al.

It is certified that error appears in the above-identified patent and that said Letters Patent is hereby corrected as shown below:

Column 2, lines 45-47, please delete "The rod elements 42 in the right lower arm section 26 are interconnected and shaped to form the mannequin shape of an individual's right upper arm."

Column 4, line 66, please delete "50" and substitute therefor --58--.

Column 5, line 4, please delete "sections 14" and substitute therefor --sections 12--.

Column 5, line 8, please delete "sections 14" and substitute therefor --sections 12--.

Column 5, line 12, please delete "hinged" and substitute therefor --hinge--.

Column 5, line 54, please delete "threadly" and substitute therefor --threadedly--.

Column 7, line 45, please delete "Opening" and substitute therefor --opening--.

UNITED STATES PATENT AND TRADEMARK OFFICE
CERTIFICATE OF CORRECTION

PATENT NO. : 5,480,074
DATED : January 2, 1996
INVENTOR(S) : Duncan, et. al.

It is certified that error appears in the above-indentified patent and that said Letters Patent is hereby corrected as shown below:

Column 10, line 51, please delete "intermediate end hinge" and substitute therefor --intermediate hinge--.

Signed and Sealed this

Nineteenth Day of November, 1996

Attest:

BRUCE LEHMAN

Attesting Officer

Commissioner of Patents and Trademarks